Figure 1:
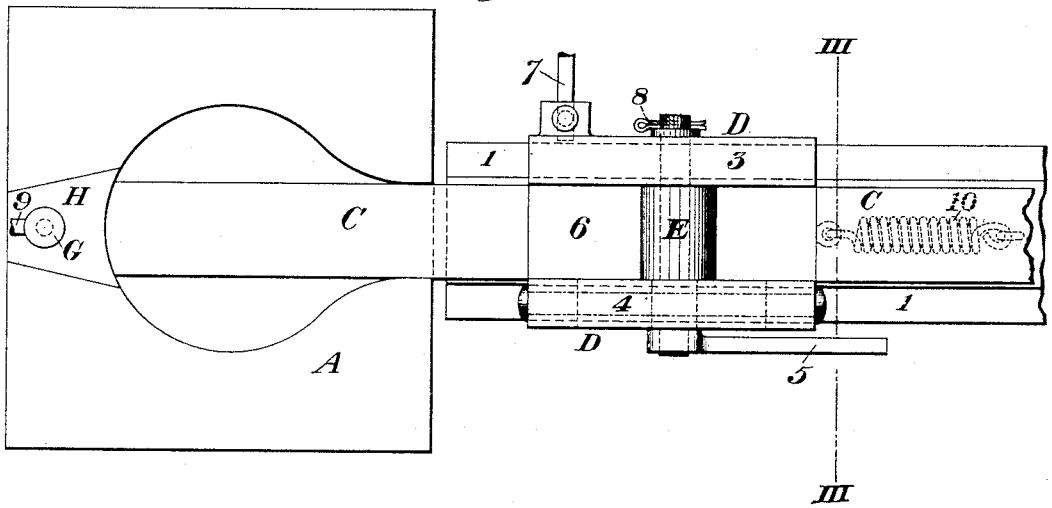

(No Model.) 2 Sheets—Sheet 1.

G. LAUDER & J. H. SIMPSON.
ELECTRIC FORGING APPARATUS.

No. 437,654. Patented Sept. 30, 1890.

WITNESSES
J. W. Bakewell
H. L. Gill

INVENTOR
George Lauder
James H. Simpson (No Model.) 2 Sheets—Sheet 2.

G. LAUDER & J. H. SIMPSON.
ELECTRIC FORGING APPARATUS.

No. 437,654. Patented Sept. 30, 1890.

WITNESSES
T. W. Bakewell
N. S. Gill

INVENTOR
George Lauder
James H. Simpson

THE NORRIS PETERS CO., PHOTO-LITHO., WASHINGTON, D. C.

UNITED STATES PATENT OFFICE.

GEORGE LAUDER AND JAMES H. SIMPSON, OF PITTSBURG, PENNSYLVANIA, ASSIGNORS TO THE CARNEGIE, PHIPPS & COMPANY, LIMITED, OF SAME PLACE.

ELECTRIC FORGING APPARATUS.

SPECIFICATION forming part of Letters Patent No. 437,654, dated September 30, 1890.

Application filed January 16, 1890. Serial No. 337,097. (No model.)

*To all whom it may concern:*

Be it known that we, GEORGE LAUDER and JAMES H. SIMPSON, of the city of Pittsburg, in the county of Allegheny and State of Pennsylvania, have invented a new and useful Improvement in the Art of Electric Forging, of which the following is a full, clear, and exact description.

Our invention consists in a novel method of and apparatus for upsetting metal in dies, in which operation the necessary heat is imparted to the metal by means of an electric current.

The particular art for which our invention has been specially designed is that of upsetting the ends of eye-bars. We shall therefore so describe it, premising, however, that our invention is not limited specially to that particular application of it, nor to the use of dies having a cavity of the form shown in the drawings, since by the substitution of dies of suitable internal configuration our method and apparatus may be adapted to the manufacture of other articles formed by the application of pressure to heated metal.

Our invention is illustrated by the accompanying drawings, in which—

Figure 2:
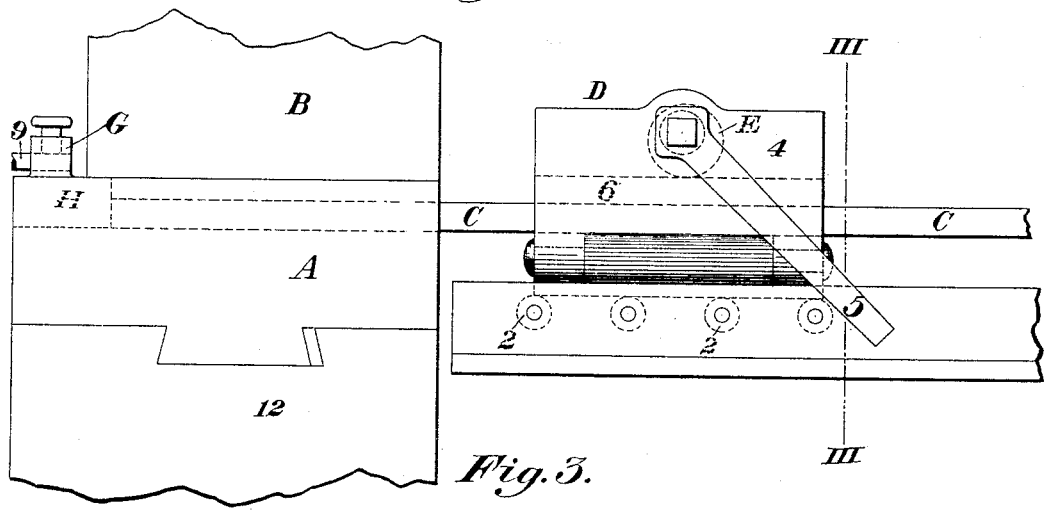
Figure 3:
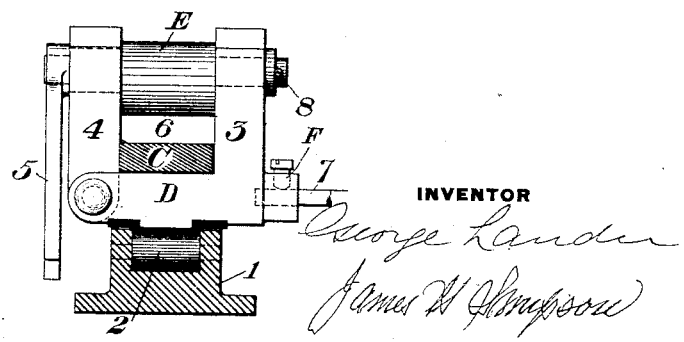
Figure 4:
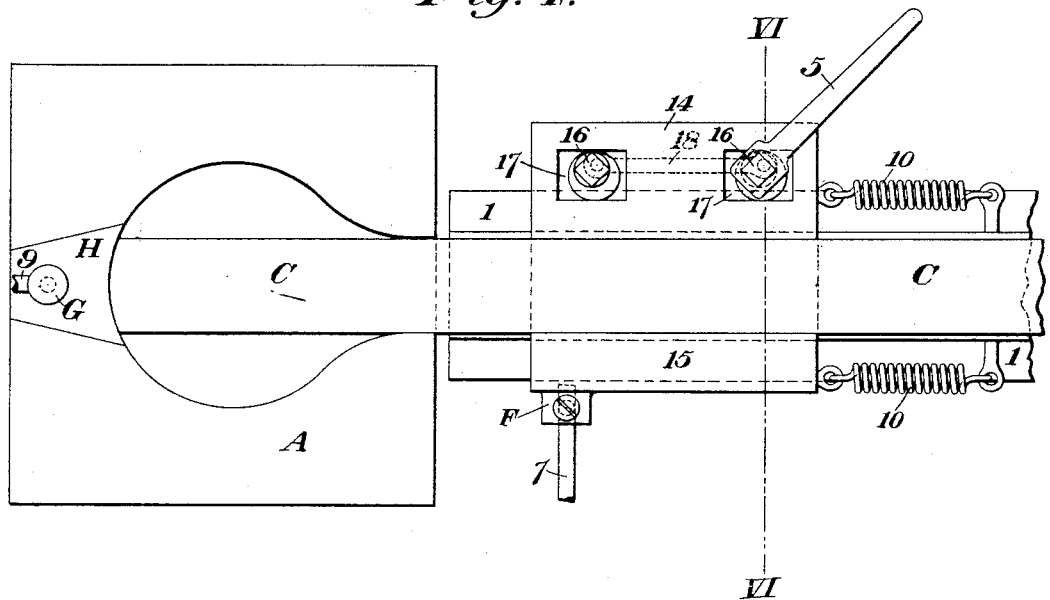
Figure 5:
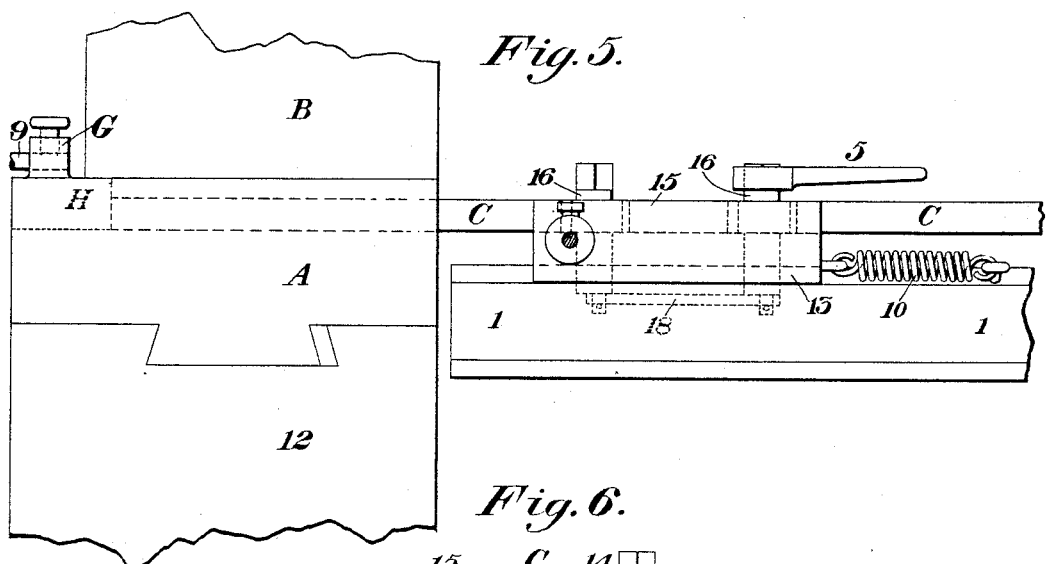
Figure 6:
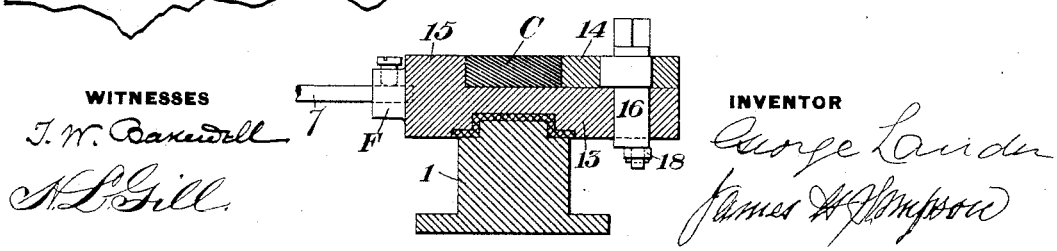

Figure 1 shows in plan view the female die, the movable clamp, and a bar or blank introduced within the said die. Fig. 2 shows the same apparatus in side elevation. Fig. 3 is a vertical cross-section on the line III III of Figs. 1 and 2. Fig. 4 is a plan view of a modified construction of our apparatus. Fig. 5 is a side elevation thereof. Fig. 6 is a vertical cross-section on the line VI VI of Fig. 4.

In the several figures like symbols refer to the same parts of the apparatus.

Referring to Figs. 1, 2, and 3, A is a female die having a cavity or matrix whose contour is that of the enlargement or head to be formed on an eye-bar, and B is a movable male die having a portion which, slightly projecting from its under face, partially enters the cavity of the female die A. In the manufacture of eye-bars the under face of the male die B would be a plane surface and of the same shape as that of the female die A. In the manufacture of other articles the male die may itself have a cavity of such shape and size as practically to limit the cavity of the female die, or the male die may have a projection or projections on its operative face. Such modifications of shape of the operative faces of these dies as will conform them to the article to be produced may readily be made by any one skilled in the art. The upper or male die may be placed loosely on top of the female die, or it may be attached to machinery by which it is to be worked, and in either case may be operated by pressure, hydraulic or otherwise, or by impact, as of a tilt-hammer or steam-hammer, in one case the article to be operated on being compressed by the male die and in the other case being struck a series of blows.

In the use of our apparatus the end of the bar or blank C which is to be upset is inserted in the cavity of the female die A, and so much of the bar as is to be operated upon is raised to the required heat by means of an electric current from a dynamo or other suitable source of electrical energy, and is upset within the die by longitudinal pressure applied to that portion of the bar which is not softened by the heat, such pressure being sufficient to cause the bar to expand and flow out laterally, and its expansion being limited by the matrix formed by the dies. In this operation the top die B either presses against the upper surface of the bar sufficiently to prevent an undesired expansion of the metal in that direction, without, however, preventing the upsetting action, or it may be caused to strike the upper surface of the bar within the female die a series of rapid blows. In the former case the male die may be loose or attached to the plunger of a press, and in the latter case it may be attached, as a hammer-die, to a trip or to a steam-hammer.

For the purpose of causing the electrical current to pass through the bar in such manner as to confine its action as much as possible to that portion of the bar which is to be operated upon within the matrix of the dies, we employ a movable clamp, to which one of the conductors of the electrical circuit in which the dies are placed is attached, connecting the other conductor with the female die. The bar to be upset is placed within the clamp, the clamp taking hold of the bar at a point as close to the die as will permit of the necessary forward motion of the clamp and bar toward the female die in upsetting, and the clamp and bar being both insulated, as is also the female die, the electric current is confined, in its passage from the positive to the negative conductor, to pass through only so much of the bar as lies in and between the clamp and the dies. When the clamp and bar have been pressed forward so as partially to upset the end of the bar within the matrix, the clamp relaxes its hold on the bar and moves backward a short distance, and then again closes on the bar, after which the end pressure is again applied to the bar, still farther staving it up within the matrix of the die, and this alternate gripping and releasing of the die by a clamp in circuit with the dynamo, and upsetting-pressure applied to the bar while so held by the grip, is repeated as often as may be necessary and constitutes our improved method of operation, the importance of which will be obvious when it is considered that by this means we are enabled practically to limit the heating of the bar to that portion which is to be upset, and that if the point of contact of the clamp were not susceptible of change it would be necessary to heat the bar for a considerable length, which would render the upsetting of the bar by end pressure very difficult, if not impossible.

As our improved method of operation is susceptible of practical application with apparatus differently constructed from that which we have devised for that purpose, we wish it to be understood that in giving the following particular description of the same we do not intend to limit the scope of our invention to the use of the precise apparatus which we shall now proceed to describe.

Referring to Figs. 1, 2, and 3, 1 represents a table or frame which supports the clamp in its travel back and forth on anti-friction rollers 2, journaled in the table or frame, and thus secures the easy motion of the clamp. The clamp consists of a carriage or box D, the bottom of which rests on the rollers 2 and has one side 3 rigidly attached to or of one piece with the bottom, and the opposite side 4 is hinged to the bottom, as shown clearly in Fig. 3. Between the upright sides 3 4, and eccentrically journaled therein, is a roller E, which when the handle 5 is turned down acts as a cam on a plate 6, placed in the carriage above and in contact with the iron bar or blank C. A removable pin 8, near the end of the journal of the cam-roller, serves to hold the movable side 4 of the box D in an upright or closed position, so that by drawing out the pin the hinged side piece 4 may be turned down, and the cam-roller E removed from its bearings to permit of the bar C being readily placed therein. The bottom and sides of the box D and the plate 6 should be made of copper or other suitable good conductor, and the entire clamp-carriage D should be insulated from the bed on which it moves. A binding-post F on the clamp-carriage D receives one terminal 7 of the electric circuit. A strong spiral spring 10 is attached to the rear end of the clamp-carriage D and also to the frame 1 and serves to draw back the carriage D whenever the upsetting pressure is withdrawn from the bar C. A contact-piece H, of copper or other good conductor, is inserted in one of the upsetting-dies in such manner as that when the bar is inserted in the female die its forward end shall come in contact with the contact-piece H to permit of the passage of the electric current, and if the contact-piece is placed at the rear end of the female die A the end of the iron bar C may be curved so as to secure a better contact. A binding-post G, of copper or other good conductor, attached to the female die so as to form contact with the contact-piece H, receives the other terminal 9 of the electric circuit. It will be found advisable to coat the inside of the cavity of the female die A and the operative face of the male die B with some suitable non-conductive wash.

In Figs. 4, 5, and 6 is shown a modification of arrangement of the parts of the clamping device to be used in cases in which for any reason it is desired to clamp the bar on its edges instead of above and below. In these figures, 12 is the anvil-block; A, the female die, and 1 the bed on which the clamping-carriage slides. This carriage consists chiefly of two parts 13 and 14, as shown by the cross-section in Fig. 6, one—the main table 13—resting upon and sliding on the frame 1, has an upward projection 15 on one side, and the other part of the sliding carriage or movable pressure-plate 14 resting upon the part 13 and forming a corresponding and parallel projection on the other side, the bar to be operated upon being placed between these two projections 14 and 15 and held in place by the sidewise pressure of the plate 14. The movable pressure-plate 14 is connected with the other part 13 of the carriage by means of two cam-bolts 16, each of which passes through a suitable round hole in the main plate 13 and through a slotted hole 17 in the movable pressure-plate, that portion which passes through the slotted hole being an eccentric or cam, so that when these bolts are turned on their axes they force the movable pressure-plate toward or move it away from the face of the projection 15 on the other side of the main plate, the cam-bolts being so set that the opposite faces of the projections 14 and 15 shall always be parallel to each other. At the lower end of each of the cam-bolts 16 is a pin projecting downward, placed eccentrically to the axis of rotation of the cams, and a link 18, connecting these pins, causes positive rotation of one cam-bolt 16 to effect a corresponding rotation of the other. A couple of spiral springs 10, attached one on each side of the bed of the clamping-carriage, are connected at the other end to the carriage-bed 1, which by their retractile force cause the withdrawal of the clamp-carriage when its hold on the bar is released, as before described. A weight at the end of a cord or chain attached at one end to the clamp-carriage and passed over a pulley may be used instead of the spring or springs, if desired. Care must be taken to insulate the clamp-carriage from its bed, or the bed from the ground, as otherwise the electric current would be grounded instead of passing through the bar. So also in the device represented in Figs. 1, 2, and 3, as well as in the modification shown in Figs. 4, 5, and 6, the handles 5, turning the cams, should either be made of a good non-conductor or should have an insulating-bushing where they are connected with the cam-shaft or cam-bolt 16, so as to prevent inconvenience or injury to the operator.

It will be understood, of course, that one of the conductors from the dynamo or other source of electrical energy is to be attached by a suitable binding-post F with the clamping-carriage.

In the use of the apparatus which we have described the metal bar to be operated upon is laid with its forward end as far as it will go within the female die, so as to press against the contact-piece H, the bar resting on the bottom of the clamping-carriage D and secured in place by turning down the handle 5. The clamping-carriage D should be placed as near to the female die A as is practicable, allowing sufficient space between them to permit of the stroke of the clamping-carriage when the bar is forced forward into the matrix of the upsetting-dies. The iron bar C having been placed within the clamping-carriage D, as described, and clamped tightly, and the clamping-carriage drawn back by the spring or weight, forward presure is applied to the bar by means of any suitable device—such as a hydraulic press or other pushing apparatus—operated by power or by hand, as may be required by the character of work to be done, and thus the bar and carriage D are carried forward, and the end of the bar, heated by the passage through it of the electric current, is more or less staved up or upset within the matrix of the dies by the end pressure applied to it. The cam-handle of the clamping-carriage is then raised, which releases its hold on the bar, and the clamping-carriage is quickly drawn back a short distance, leaving the end of the bar within the die. The cam-handle is then turned so as to clamp the bar and end pressure is again applied to the bar, renewing the upsetting action on the end of the bar. These successive steps of clamping the bar, and thus restoring the electric current through that part of the bar which is to be upset, feeding it forward with sufficient force to stave it up, and then releasing and withdrawing the clamp, are repeated as frequently as may be necessary to complete the upsetting operation. During the time that the forward pressure is being applied to the bar C the upper or male die B may be operated either to limit the expansion of the metal in that direction or to assist in forging it by repeated taps of the hammer.

The advantages of our invention will be appreciated by those skilled in the art. By its use iron bars may be upset and shaped rapidly and economically without heating more of the bar than is necessary to the proper performance of the work, and that portion of the bar which is to be upset is subjected to a uniform and practically continuous heat during repeated applications of the upsetting and compressing dies.

Having described our invention in its construction and operation, what we claim as our invention, and desire to secure by Letters Patent, is—

1. In the art of electrically forging metallic bars or blanks, the improvement, substantially as hereinbefore described, which consists in including a portion only of the bar or blank in an electric circuit, thereby subjecting that portion of the bar or blank to its heating and softening action, applying end pressure to upset that portion of the bar or blank, and from time to time increasing the distance between the points on the bar at which the current is applied, substantially as described.

2. In the art of electrical forging of metallic bars or blanks, placing the end of the bar to be upset between a suitable pair of upsetting-dies while the bar is held by a clamping device to which the upsetting pressure is applied, placing the normally-insulated upsetting-die and clamping device in the circuit of a suitable source of electrical energy by connecting each with one of the conductors of the electric circuit, passing the current through the bar so as to raise that portion of it which lies between the die and the clamping device to a suitable heat, applying the upsetting pressure to force the heated end of the bar into the upsetting-die, releasing the hold of the clamping device and drawing it back far enough to take a fresh hold on the bar, and repeating the operation as frequently as may be necessary to complete the upsetting operation, substantially as described.

3. In apparatus for electrically upsetting metallic bars or blanks, the combination of a pair of co-operating upsetting-dies, a clamping device for receiving and holding the bar or blank to which the upsetting-pressure is to be applied, and a retractile device for drawing back the clamping device when its hold on the bar is released for taking fresh hold lower down on the bar previous to the repetition of the upsetting-pressure, substantially as described.

4. In apparatus for electrically forging metallic bars or blanks, the combination of upsetting-dies, a clamping device adapted to hold the bar to be operated on and of releasing such hold at the will of the operator, an electric circuit, a device for applying an upsetting-pressure to the bar, and means for withdrawing the clamping device when its hold on the bar is released, substantially as described.

5. In apparatus for electrically forging metal, a traveling clamping device consisting of the combination of a box adapted to receive and hold a metallic bar or blank, a movable side, one or more eccentrics set in the box and movable so as to clamp such bar or blank, and an electric circuit, substantially as described.

6. In apparatus for enlarging portions of metallic bars or blanks by electrical upsetting, the combination of a die having a cavity for the reception and shaping of the bar or blank, means for forcing the metal into the upsetting-die, a second die which operates on the bar or blank transversely to the line of entrance of the metal, and an electric circuit which includes the part of the metal to be upset, substantially as described.

7. In apparatus for electric upsetting of metals, a retractile clamp constructed to hold and move with the metal bar to be upset, an electric circuit, and means for including the clamp therein, substantially as and for the purposes described.

8. In apparatus for electrical upsetting of metals, the combination of upsetting die or dies, means for forcing the metal bar or blank into the die-cavity, a retractile clamp, and means for connecting the die and clamp in an electric circuit, substantially as described.

9. In apparatus for electric upsetting of metals, an insulated clamp for holding and moving with the metal bar or blank, a device for automatically retracting the clamp without the bar, in combination with means for forcing the bar or blank into the die, substantially as described.

In testimony whereof we have hereunto set our hands this 24th day of December, A. D. 1889.

GEORGE LAUDER.
JAMES H. SIMPSON.

Witnesses:
W. B. CORWIN,
JNO. K. SMITH.